United States Patent
Asakura et al.

(10) Patent No.: US 8,220,940 B2
(45) Date of Patent: Jul. 17, 2012

(54) ANTIGLARE FILM, ANTIREFLECTION FILM, POLARIZING PLATE AND IMAGE DISPLAY DEVICE

(75) Inventors: Tetsuya Asakura, Minami-Ashigara (JP); Shinya Kato, Minami-Ashigara (JP); Masaaki Suzuki, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 230 days.

(21) Appl. No.: 12/551,965

(22) Filed: Sep. 1, 2009

(65) Prior Publication Data

US 2010/0053756 A1    Mar. 4, 2010

(30) Foreign Application Priority Data

Sep. 2, 2008 (JP) ................. P2008-225215

(51) Int. Cl.
*G02B 27/00* (2006.01)
(52) U.S. Cl. .................................................. 359/601
(58) Field of Classification Search .................. None
See application file for complete search history.

(56) References Cited

U.S. PATENT DOCUMENTS

2007/0291367 A1    12/2007    Hamamoto et al.

FOREIGN PATENT DOCUMENTS

| JP | 2004-217847 A | 8/2004 |
|---|---|---|
| JP | 2007-286226 A | 11/2007 |
| JP | 2007-321143 A | 12/2007 |
| JP | 2007-334064 A | 12/2007 |
| JP | 2008-81649 A | 4/2008 |

OTHER PUBLICATIONS

English machine translation of JP 2008-081649 A. Translated Sep. 21, 2011.*
English machine translation of JP 2007-286226 A. Translated Sep. 21, 2011.*
English machine translation of JP 2004-217847 A. Translated Sep. 21, 2011.*
Office Action in Japanese Application No. 2008-225215 mailed Apr. 12, 2011, including English translation.
Japanese Notification of Reasons for Refusal dated Feb. 28, 2012 for Japanese Application No. 2008-225215, with English translation.

* cited by examiner

*Primary Examiner* — Derek S Chapel
(74) *Attorney, Agent, or Firm* — Birch, Stewart, Kolasch & Birch, LLP

(57) ABSTRACT

An antiglare film is provided, the antiglare film including: a transparent support; and an antiglare layer, wherein the antiglare layer contains a light-transmitting resin particle, a light-transmitting resin and a copolymerization product having an amine value of 1 to 30 mgKOH/g, and the average particle diameter of the light-transmitting resin particle is from 6 to 20 μm.

9 Claims, 1 Drawing Sheet

ANTIGLARE FILM, ANTIREFLECTION FILM, POLARIZING PLATE AND IMAGE DISPLAY DEVICE

BACKGROUND OF THE INVENTION

1. Field of the Invention

The present invention relates to an antiglare film, an antireflection film, a polarizing plate and an image display device.

2. Description of the Related Art

In various image display devices such as liquid crystal display device (LCD), plasma display panel (PDP), electroluminescent display (ELD) and cathode ray tube display device (CRT), an antiglare film or an antiglare antireflection film is used on the display surface so as to prevent reduction in the contrast due to reflection of outside light or disturbing reflection of an image. With widespread usage of the image display device in an office or household environment, it is required to enhance the antiglare property of preventing a fluorescent lamp in room or the viewer's figure from causing disturbing reflection on the display surface and more improve the display contrast in a bright place.

In an antiglare film, a light-transmitting particle is added to the antiglare layer so as to utilize an antiglare function of causing light scattering by making use of unevenness produced on the antiglare layer surface (surface scattering property) and a light scattering function owing to difference in the refractive index between the light-transmitting particle and the light-transmitting resin in the antiglare layer (internal scattering property). The surface scattering property can be obtained by controlling the surface unevenness by the utilization of aggregating property of the light-transmitting particle.

One of means for improving the dispersibility of the light-transmitting particle is addition of a dispersant. There is disclosed a coating material composition for the formation of a hardcoat layer, where a (meth)acrylate copolymerization product containing an amino group or a quaternary ammonium group is contained in the fine particle (JP-A-2004-217847, the term "JP-A" as used herein meaning an "unexamined published Japanese patent application"). However, JP-A-2004-217847 limits the fine particle to a silica fine particle and is silent on a resin particle.

It is well known in the art that in the case of a resin particle of less than 6 μm, the aggregating property of the particle can be controlled by changing its composition, but in the case of a light-transmitting resin particle having an average particle diameter of 6 to 20 μm, even when the composition of the particle is changed, aggregation of particles cannot be prevented. The reason therefor is considered because the large particle diameter allows for a high precipitation rate to bring about thickening by drying immediately after the coating and this requires the particle to travel a long precipitation distance until it becomes non-flowable.

That is, aggregation of particles proceeds by a snowball effect while repeating a cycle of a process where the collision frequency of particles with each other is increased and the apparent particle diameter of the particle resulting from aggregation by collision becomes large to make the precipitation rate higher and the precipitation distance longer and further increase the collision frequency of particles with each other. Also, in the case where the aggregating property of particle is large, the arithmetic mean roughness of the film is increased and denseness of black in a bright place is deteriorated to impair the image quality. Thus, it is demanded to reduce the aggregating property of the particle.

SUMMARY OF THE INVENTION

An object of the present invention is to provide an antiglare film excellent in the denseness of black and the antiglare property. Another object of the present invention is to provide an antireflection film, a polarizing plate and an image display device, each having the antiglare film.

As a result of intensive studies, the present inventors have found that when the antiglare film has, on a transparent support, an antiglare layer containing at least one kind of a light-transmitting resin particle having an average particle diameter of 6 to 20 μm, at least one kind of a light-transmitting resin and at least one kind of a copolymerization product having an amine value of 1 to 30 mgKOH/g, an antiglare film excellent in the antiglare property and the denseness of black can be produced. The present invention has been accomplished based on this finding.

That is, the present invention is as follows:

(1) An antiglare film, including:
a transparent support; and
an antiglare layer,
wherein the antiglare layer contains a light-transmitting resin particle, a light-transmitting resin and a copolymerization product having an amine value of 1 to 30 mgKOH/g, and
the average particle diameter of the light-transmitting resin particle is from 6 to 20 μm.

(2) The antiglare film according to item (1) above,
wherein the copolymerization product is a modified acrylic block copolymerization product.

(3) The antiglare film according to item (1) or (2) above,
wherein an acid value of the copolymerization product is 20 mgKOH/g or less.

(4) The antiglare film according to any of items (1) to (3) above,
wherein a mass average molecular weight of the copolymerization product is from 1,000 to 100,000.

(5) The antiglare film according to any of items (1) to (4) above,
wherein the copolymerization product is contained in a range of 0.01 to 5.0 mass % based on the light-transmitting resin.

(6) The antiglare film according to any of items (1) to (5) above,
wherein a content of the light-transmitting resin particle in the antiglare layer is from 3 to 30 mass %.

(7) The antiglare film according to any of items (1) to (6) above,
wherein a film thickness of the antiglare layer is from 4 to 35 μm.

(8) The antiglare film according to any of items (1) to (7) above,
wherein the antiglare layer is a layer containing a structural unit formed from a polymer or copolymer including at least one member of following (A1) and (A2) or from a mixture of the polymer and copolymer:

(A1) an alkyl acrylate containing an alkyl group having a group selected from the group consisting of a hydroxyl group and an acryloyl group; and (A2) an alkyl methacrylate containing an alkyl group having a group selected from the group consisting of a hydroxyl group and an acryloyl group.

(9) An antireflection film, including:
the antiglare film according to any of items (1) to (8) above; and
a low refractive index layer having a refractive index which is lower than a refractive index of the antiglare layer.

(10) The antireflection film according to item (9) above, wherein the low refractive index layer contains a hollow silica particle.

(11) A polarizing plate, including:
two protective films; and
a polarizing film provided between the protective films, wherein at least one of the protective films is the antiglare film according to any of items (1) to (8) or the antireflection film according to item (9) or (10) above.

(12) An image display device, including a display, wherein the antiglare film according to any of items (1) to (8), the antireflection film according to item (9) or (10) or the polarizing plate according to item (11) above is disposed at a surface of the image display.

DETAILED DESCRIPTION OF THE INVENTION

Figure 1:
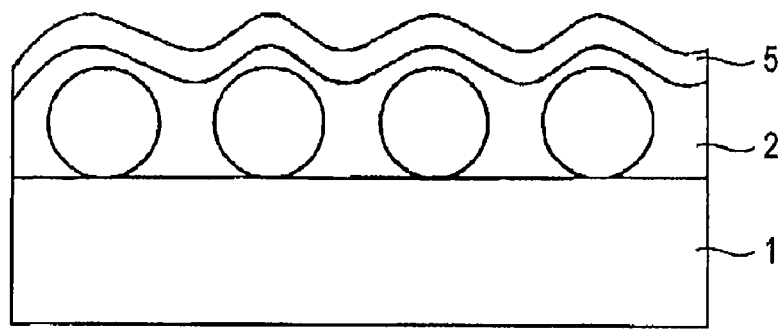
FIG. 1 shows a schematic cross-sectional view schematically showing a preferred embodiment of the film of the present invention.

The present invention is described in detail below. Incidentally, the expression "from (numerical value 1) to (numerical value 2)" as used in the present invention for indicating a physical value, a characteristic value or the like means "(numerical value 1) or more and (numerical value 2) or less". Also, the term "(meth)acrylate" as used in the present invention means "at least either acrylate or methacrylate". The same applies to "(meth)acrylic acid" and the like.

The antiglare film of the present invention is an antiglare film comprising a transparent support and an antiglare layer, wherein the antiglare layer contains at least one kind of a light-transmitting resin particle, at least one kind of a light-transmitting resin and at least one kind of a copolymerization product having an amine value of 1 to 30 mgKOH/g and the average particle diameter of the light-transmitting resin particle is from 6 to 20 μm.

<Layer Construction of Antiglare Film>

The antiglare film of the present invention has at least one antiglare layer on a transparent support. The antiglare layer may be composed of one layer or a plurality of layers, for example, from 2 to 4 layers.

Examples of the layer construction preferred as the antiglare film of the present invention or as an optical film containing the antiglare film are set forth below. In the following constructions, the substrate film indicates a transparent support composed of a film.

Substrate film/antiglare layer
Substrate film/antistatic layer/antiglare layer
Substrate film/antiglare layer/surface conditioning layer
Substrate film/antiglare layer/low refractive index layer
Substrate film/antiglare layer/surface conditioning layer/low refractive index layer
Substrate film/antiglare layer/antistatic layer/low refractive index layer
Substrate film/hardcoat layer/antiglare layer/low refractive index layer
Substrate film/hardcoat layer/antiglare layer/antistatic layer/low refractive index layer
Substrate film/hardcoat layer/antistatic layer/antiglare layer/low refractive index layer
Substrate film/antiglare layer/high refractive index layer/low refractive index layer
Substrate film/antiglare layer/medium refractive index layer/high refractive index layer/low refractive index layer
Antistatic layer/substrate film/antiglare layer/medium refractive index layer/high refractive index layer/low refractive index layer
Substrate film/antistatic layer/antiglare layer/medium refractive index layer/high refractive index layer/low refractive index layer
Antistatic layer/substrate film/antiglare layer/high refractive index layer/low refractive index layer/high refractive index layer/low refractive index layer In the antiglare film of the present invention, a layer other than the antiglare layer may be provided by coating. Examples of such a layer include a hardcoat layer, an antistatic layer, a low refractive index layer and an antifouling layer. The antiglare layer preferably has also the functions of a hardcoat layer, an antistatic layer, an antifouling layer and the like. By having these layers, the antiglare film of the present invention can be suitably used as an optical film.

In the present invention, in view of low reflection, an antireflection film having a construction containing a medium refractive index layer/a high refractive index layer/a low refractive index layer is preferred, and examples thereof include the constructions described in JP-A-8-122504, JP-A-8-110401, JP-A-10-300902, JP-A-2002-243906 and JP-A-2000-111706. In terms of simple production and high productivity, preferred embodiments of the present invention are an antiglare film having a single-layer antiglare layer on a support and an antireflection film having a single-layer antiglare layer and a single-layer low refractive index layer in this order on a support.

Figure 2:
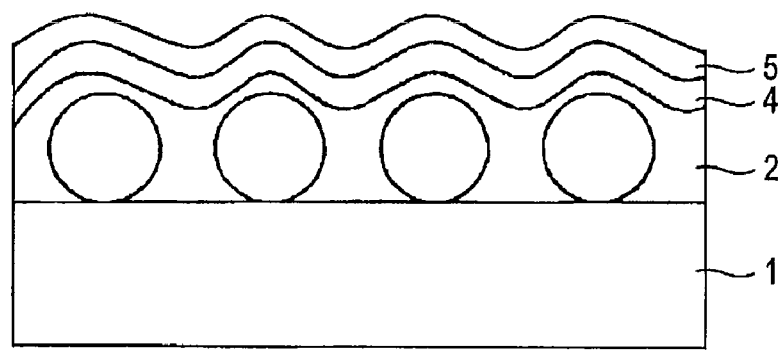
FIG. 2 shows a schematic cross-sectional view schematically showing a preferred embodiment of the film of the present invention.
Figure 3:
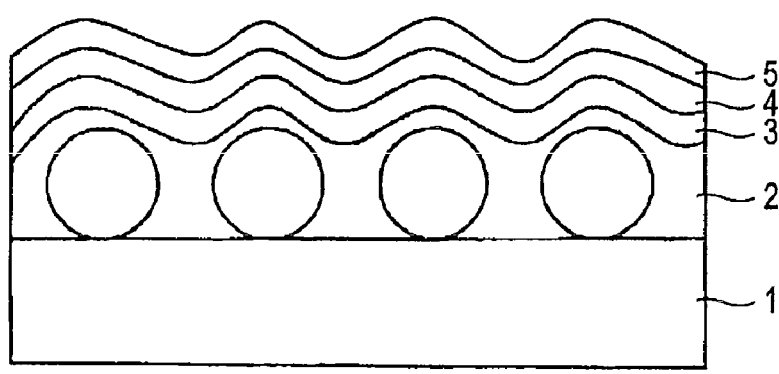
FIG. 3 shows a schematic cross-sectional view schematically showing a preferred embodiment of the film of the present invention.

FIGS. 1 to 3 each is a schematic cross-sectional view schematically showing a preferred embodiment of the film of the present invention. In FIG. 1, an antiglare layer (2) and a low refractive index layer (5) are stacked in this order on a transparent support (1). In the embodiment of FIG. 2, a high refractive index layer (4) is provided between an antiglare layer (2) and a low refractive index layer (5). In the embodiment of FIG. 3, a medium refractive index layer (3) and a high refractive index layer (4) are provided in this order between an antiglare layer (2) and a low refractive index layer (5).

<Construction of Antiglare Layer>

The antiglare layer for use in the present invention can be obtained by coating, drying and curing a coating solution containing a light-transmitting resin particle having an average particle diameter of 6 to 20 μm, a matrix-forming component (e.g., monomers for binder) that becomes a light-transmitting resin, a copolymerization product having an amine value of 1 to 30 mgKOH/g, an appropriate organic solvent and the like.

The coating solution for forming the antiglare layer contains, for example, monomers for a main binder, which are raw materials of a light-transmitting resin (binder polymer) formed after curing by ionizing radiation or the like, the above-described light-transmitting particle having a specific particle diameter, and a polymerization initiator and preferably further contains a polymer compound for adjusting the viscosity of the coating solution, an inorganic microfiller for reducing curling or adjusting the refractive index or the like, and a coating aid.

The thickness of the antiglare layer is preferably from 3 to 40 μm, more preferably from 4 to 35 μm, still more preferably from 10 to 25 μm, and most preferably from 11 to 14 μm. When the thickness of the antiglare layer is 3 μm or more, the surface unevenness does not become excessively large, which is preferred in terms of denseness of black, and when the thickness is 40 μm or less, the surface unevenness is not too small to ensure sufficient antiglare property and the thickness in this range is also preferred in view of brittleness.

The refractive index of the binder polymer can be measured, for example, directly by an Abbe refractometer or by spectral reflection spectrum or spectral ellipsometry and thereby can be quantitatively evaluated. The refractive index of the light-transmitting particle is determined by a method where the light-transmitting particle is dispersed in equal amounts in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

<Copolymerization Product of Antiglare Layer>

The copolymerization product having an amine value of 1 to 30 mgKOH/g (hereinafter sometimes referred to as the "copolymerization product of the present invention") for use in the present invention is effective in suppressing aggregation of light-transmitting resin particles, which is described later. The amine group acts as an adsorptive group and the copolymerization product adsorbs to the surface of a light-transmitting particle and thereby creates a steric hindrance between light-transmitting resin particles. In the case where a particle is precipitated immediately after coating, even when the particle collides and contacts with a neighboring particle, the steric hindrance is considered to prevent the particles from aggregating together and allow no aggregation into a giant particle, making small the surface unevenness of the antiglare layer and producing a dense black effect. Furthermore, when a low refractive index layer is provided by coating on the antiglare layer, thanks to the small surface unevenness, the low refractive index layer can be uniformly coated and the reflectance is reduced as compared with the case of not adding the copolymerization product, as a result, the denseness of black is more enhanced.

The amine value of the copolymerization product for use in the present invention is from 1 to 30 mgKOH/g, preferably from 2 to 20 mgKOH/g. If the amine value does not exceed 30 mgKOH/g or if the amine value is not less than 1 mgKOH/g or zero, the particle dispersibility is enhanced and denseness of black can be obtained. The amine value indicates the total amount of primary, secondary and tertiary amines and is defined as the mg number of potassium hydroxide equivalent to hydrochloric acid necessary for neutralizing 1 g of a sample, and the measuring method therefor is based on JIS K 7237.

As for the added amount of the copolymerization product of the present invention, the copolymerization product is preferably contained in a range from 0.01 to 5.0 mass %, more preferably from 0.1 to 5.0 mass %, still more preferably from 0.1 to 3.0 mass %, yet still more preferably from 0.1 to 2.0 mass %, and most preferably from 0.5 to 2.0 mass %, based on the light-transmitting resin. If the added amount does not exceed 5.0 mass %, the coating film less likely to suffer from bad transparency or be reduced in the adherence to the support or the upper layer or a dispersion failure of particles may be caused, whereas if the added amount is not less than 0.01 mass %, the particle dispersibility is not deteriorated and denseness of black is obtained.

The copolymerization product (dispersant) having an amine value of 1 to 30 mgKOH/g for use in the present invention is, when employed as a dispersant for an organic pigment, usually used in an amount of 15 to 70 mass % in many cases. However, if the dispersant is added in an amount of 15 to 70 mass % to the light-transmitting resin, when the resin is formed as a coating film in an antiglare film or an antireflection film, the coating film may suffer from bad transparency or be reduced in the adherence to the support or the upper layer. Thus, the dispersant can be hardly used in this range. In the present invention, it has been found that dispersibility is unexpectedly enhanced by using the dispersant preferably in a range of 0.01 to 5.0 mass % based on the entire amount of the light-transmitting resin.

The copolymerization product for use in the present invention is preferably a block copolymerization product, more preferably a modified acrylic block copolymerization product. Use of a block copolymerization product enables satisfying both good dispersibility and transparency of the coating film.

In general, the acid value of the copolymerization product for use in the present invention is preferably low, though this may vary depending on the presence or absence and kind of an acidic group responsible for the acid value. The acid value is preferably 20 mgKOH/g or less, more preferably 10 mgKOH/g or less.

The mass average molecular weight (Mw) of the copolymerization product for use in the present invention is preferably from 1,000 to 100,000, more preferably from 1,000 to 10,000, still more preferably from 1,000 to 5,000. If the molecular weight of the block copolymerization product is not too small, the dispersion stability may be enhanced, whereas if it is not excessively large, the dispersibility does not tend to be deteriorated.

The mass average molecular weight is a molecular weight determined by differential refractometer detection with a solvent THF in a GPC analyzer using a column TSKgel GMHxL, TSKgel G4000HxL or TSKgel G2000HxL (trade names, all produced by Tosoh Corp.) and expressed in terms of polystyrene.

Specific compound examples of the copolymerization product having an amine value of 1 to 30 mgKOH/g for use in the present invention are not particularly limited as long as the above-described physical value is satisfied. The preferred compound includes a commercially available wet dispersant, and examples of the compound which can be used include a wet dispersant produced by BYK-Chemie, such as Disperbyk-161, Disperbyk-162, Disperbyk-163, Disperbyk-164, Disperbyk-166, Disperbyk-167, Disperbyk-168, Disperbyk-182, Disperbyk-183, Disperbyk-184, Disperbyk-185, Disperbyk-2000, Disperbyk-2001, Disperbyk-2009, Disperbyk-2050 and Disperbyk-2070, and a pigment dispersant produced by Kusumoto Chemicals, Ltd., such as Disparlon DA-703-50, Disparlon DA-325, Disparlon DA-7301, Disparlon 1860 and Disparlon 7004. Among these, in view of particle dispersibility and side-effect on film transparency, a modified acrylic block copolymerization product is preferred. Above all, Disperbyk-2000 is effectively used. One of those copolymerization products may be used alone or two or more thereof may be used in combination.

The method for dispersing the light-transmitting resin particle is not particularly limited, but the dispersion can be prepared using a known disperser, that is, a disperser such as ball mill, roll mill, bead mill, high-speed disperser, Polytron disperser, dissolver, magnetic stirrer and ultrasonic disperser. In particular, the light-transmitting resin particle is preferably dispersed using a Polytron disperser, a dissolver, a magnetic stirrer or an ultrasonic disperser. As for the dispersion method, a method of charging an organic solvent into the disperser above, dispersing the light-transmitting resin particle, and then adding and dispersing the copolymerization compound having an amine value of 1 to 30 mgKOH/g is preferred.

<Light-Transmitting Resin Particle of Antiglare Layer>

In the present invention, the average particle diameter of the light-transmitting resin particle dispersed in the antiglare layer is from 6.0 to 20 μm, preferably from 7.5 to 15 μm, more preferably from 8.0 to 12 μm. If the average particle diameter is not less than 6.0 μm, the light scattering angle distribution does not spread to a wide angle and therefore, character blurring less likely to be disadvantageously caused on the display, whereas if the average particle diameter does not exceed 20 μm, the film thickness of the layer to which the light-transmitting resin particle is added does not need to be made thick and there does not arise a problem such as curling or rise of cost.

The refractive index of the light-transmitting resin particle is preferably from 1.46 to 1.65, more preferably from 1.47 to 1.60, still more preferably from 1.49 to 1.58.

Specific preferred examples of the light-transmitting resin particle include a resin particle such as crosslinked polymethyl methacrylate, crosslinked methyl methacrylate-styrene copolymer, crosslinked methyl methacrylate-methyl acrylate copolymer, crosslinked acrylate-styrene copolymer particle, crosslinked polystyrene particle, crosslinked methyl methacrylate-crosslinked modified acrylate copolymer particle, melamine/formaldehyde resin particle and benzoguanamine/formaldehyde resin particle. Among these, a crosslinked polymethyl methacrylate and a crosslinked methyl methacrylate-styrene copolymer particle are preferred.

The amount of the light-transmitting resin particle added is preferably from 3 to 30 mass %, more preferably from 6 to 25 mass %, and most preferably from 10 to 20 mass %, based on the antiglare layer (as solid content). With this added amount, when the film is used on the surface of a liquid crystal display device (LCD), appropriate internal scattering is obtained, image blurring and white turbid surface as well as reduction of display contrast are little caused, and good performance in terms of glaring is ensured.

The density of the light-transmitting resin particle is preferably from 5 to 2,500 mg/m$^2$, more preferably from 10 to 1,000 mg/m$^2$, still more preferably from 100 to 700 mg/m$^2$.

In the present invention, at least two kinds of particles are preferably contained as the light-transmitting resin particle. The at least two kinds of light-transmitting resin particles preferably differ in the particle diameter and/or the refractive index.

Also, a particle other than the light-transmitting resin particle having an average particle diameter of 6 to 20 μm may be contained. The other particle may be either a resin particle or an inorganic fine particle.

In the present invention, an embodiment containing only two kinds of light-transmitting resin particles having an average particle diameter of 6 to 20 μm is preferred.

It is preferred to take an embodiment where out of two kinds of light-transmitting resin particles, one light-transmitting resin particle has a refractive index lower than that of the light-transmitting resin and the other has a refractive index higher than that of the light-transmitting resin. For example, the higher refractive index-side particle preferably has a refractive index higher than that of the light-transmitting resin by 0.010 to 0.050, more preferably by 0.010 to 0.030, and the lower refractive index-side particle preferably has a refractive index lower than that of the light-transmitting resin by 0.010 to 0.050, more preferably by 0.010 to 0.030. By virtue of a refractive index difference between the two kinds of light-transmitting resin particles, it becomes easy to control internal scattering and surface profile.

Specific examples of the other particle include a resin particle such as crosslinked polymethyl methacrylate particle, crosslinked methyl methacrylate-styrene copolymer particle, crosslinked polystyrene particle, crosslinked methyl methacrylate-methyl acrylate copolymer particle, crosslinked acrylate-styrene copolymer particle, melamine/formaldehyde resin particle and benzo-guanamine/formaldehyde resin particle. Among these, a crosslinked styrene particle, a crosslinked polymethyl methacrylate particle and a crosslinked methyl methacrylate-styrene copolymer particle are preferred. Also, a so-called surface-modified particle obtained by chemically binding a compound containing a fluorine atom, a silicon atom, a carboxyl group, a hydroxyl group, an amino group, a sulfonic acid group, a phosphoric acid group or the like to the surface of the resin particle above, or a particle obtained by binding a nano-size inorganic fine particle such as silica or zirconia to the surface, may be preferably used. Furthermore, an inorganic fine particle may also be used. Specific examples of the inorganic fine particle that is particularly preferred include a silica particle and an alumina particle, with a silica particle being more preferred.

As for the average particle diameter of the light-transmitting resin particle, in both cases where two or more particles are adjacently present in the coating film and where particles are independently present, the average particle diameter indicates a primary particle diameter. However, in the case where aggregating inorganic particles having a primary particle diameter of about 0.1 μm are dispersed in a coating solution as a secondary particle to a size satisfying the particle size of the present invention and then coated, the secondary particle diameter is used as the average particle diameter.

The shape of the light-transmitting resin particle may be either truly spherical or amorphous. As for the particle size distribution, in view of the control of haze value and diffusion and the homogeneity of coated surface state, a monodisperse particle is preferred. For example, when a particle having a particle diameter larger than the average particle diameter by 33% or more is defined as a coarse particle, the percentage of this coarse particle in the number of all particles is preferably 1% or less, more preferably 0.8% or less, still more preferably 0.4% or less.

Also, for example, when a particle having a particle diameter smaller than the average particle diameter by 16% or more is defined as a microparticle, the percentage of the microparticle in the number of all particles is preferably 10% or less, more preferably 6% or less, still more preferably 4% or less. The particle having such a particle diameter distribution can be obtained by performing classification after a normal synthesis reaction, and when the number of classifications is increased or the level of classification is raised, a particle having a more preferred distribution can be obtained. For the classification, it is preferred to use a method such as air classification, centrifugal classification, precipitation classification, filtration classification or electrostatic classification.

The particle size distribution of the particle is measured by a Coulter counter method, and the measured distribution is converted into a particle number distribution. The average particle diameter may be calculated from the obtained particle distribution or may be measured using a light-scattering method or an electron micrograph.

In the case of the light-transmitting resin particle above, since the light-transmitting resin particle readily precipitates in the binder, an inorganic filler may be added so as to prevent the precipitation. Incidentally, addition of an inorganic filler in a larger amount is effective in preventing precipitation of the light-transmitting particle but adversely affects the transparency of the coating film. Accordingly, it is preferred to contain an inorganic filler having a particle diameter of 0.5 μm or less to an extent of not impairing the transparency of the coating film, that is, in an amount of approximately less than 0.1 mass %.

Specific examples of the light-transmitting resin particle which can be used include a commercially available resin particle, such as Chemisnow MX600, MX675, RX0855, MX800, SX713L and MX1500H produced by Soken Chemical & Engineering Co., Ltd., and Techpolymer SSX108HXE, SSX108LXE, SSX-106TN, SSX-106FB and XX120S produced by Sekisui Plastics Co., Ltd.

In the antiglare film of the present invention, the haze value attributable to surface scattering is preferably from 0 to 10%, more preferably from 0.5 to 5%.

In the antiglare film of the present invention, the arithmetic mean roughness Ra in accordance with JIS (Japanese Industrial Standards)-B0601 (2001) is preferably from 0.05 to 0.25 μm, more preferably from 0.10 to 0.20 μm, and most preferably from 0.12 to 0.19 μm.

In the antiglare film of the present invention, the average distance RSm between irregularities in accordance with JIS-B0601 (2001) is preferably from 50 to 350 μm, more preferably from 55 to 150 μm, and most preferably from 60 to 90 μm or from 300 to 350 μm.

In the antiglare film of the present invention, the average tilt angle θa in accordance with ASME-1995 is preferably from 0.5 to 2.0°, more preferably from 0.6 to 1.2°, and most preferably from 0.7 to 1.0°.

In the antiglare film of the present invention, by setting the surface haze and surface roughness to fall in the above-described ranges, an antiglare film with excellent denseness of black can be obtained.

In the antiglare film of the present invention, the haze value attributable to internal scattering is preferably from 8 to 90%, more preferably from 10 to 40%, and most preferably from 10 to 30%.

In the antiglare film of the present invention, the sum of image clarities measured by four kinds of optical combs defined in JIS (Japanese Industrial Standards) K7105 is preferably 300% or less, more preferably from 80 to 200%, and most preferably from 90 to 150%. By setting the internal haze and image clarity to fall in these ranges, two performances in terms of reduction in the surface contrast and prevention of glaring can be practically satisfied.

<Preparation of Light-Transmitting Resin Particle>

Examples of the production method of the light-transmitting resin particle for use in the present invention include a suspension polymerization method, an emulsion polymerization method, a soap-free emulsion polymerization method, a dispersion polymerization method and a seed polymerization method, and any of these production methods may be employed. These methods may be performed by referring to the methods described, for example, in Takayuki Ohtsu and Masaetsu Kinoshita, *Kobunshi Gosei no Jikken Ho* (*Experimental Technique for the Synthesis of Polymer*), page 130 and pages 146 to 147, Kagaku Dojin Sha, *Gosei Kobunshi* (*Synthetic Polymer*), Vol. 1, pp. 246-290, *ibid.*, Vol. 3, pp. 1-108, Japanese Patents 2,543,503, 3,508,304, 2,746,275, 3,521,560 and 3,580,320, JP-A-10-1561, JP-A-7-2908, JP-A-5-297506 and JP-A-2002-145919.

<Polymer Binder of Antiglare Layer>

The binder polymer for forming the matrix constituting the antiglare layer is not particularly limited but is preferably a light-transmitting binder polymer having a saturated hydrocarbon chain or polyether chain as the main chain after curing by ionizing radiation or the like. Also, the main binder polymer after curing preferably has a crosslinked structure.

The binder polymer preferably constitutes from 55 to 94 mass %, more preferably from 75 to 90 mass %, in the antiglare layer (as solid content).

In order to obtain the desired internal scattering, the refractive indexes of the light-transmitting resin particle and light-transmitting resin (matrix) are preferably adjusted. The absolute value of the refractive index difference between the light-transmitting resin particle and the light-transmitting resin is preferably from 0.001 to 0.050, more preferably from 0.015 to 0.040, and most preferably from 0.010 to 0.030.

As a material for forming the binder polymer having a saturated hydrocarbon chain as the main chain after curing, an ethylenically unsaturated monomer selected from the compounds of the first group described below or a polymer thereof is preferable. Also, as a material for forming the polymer having a polyether chain as the main chain, an epoxy-based monomer selected from the compounds of the second group described below or a polymer obtained by the ring-opening polymerization of such a monomer is preferable. A polymer composed of a mixture of these monomers is also preferred.

In the present invention, as regards the compound of the first group, the binder polymer having a saturated hydrocarbon chain as the main chain and at the same time, having a crosslinked structure is preferably a (co)polymer of a monomer having two or more ethylenically unsaturated groups. In order to raise the refractive index, the monomer preferably contains, in its structure, an aromatic ring or at least one atom selected from a halogen atom except for fluorine, a sulfur atom, a phosphorus atom and a nitrogen atom.

Examples of the monomer having two or more ethylenically unsaturated groups, which is used in the binder polymer for forming the antiglare layer, include an ester of polyhydric alcohol and (meth)acrylic acid {e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate}; vinylbenzene and a derivative thereof (e.g., 1,4-divinylbenzene, 2-acryloylethyl 4-vinylbenzoate, 1,4-divinylcyclohexanone); a vinylsulfone (e.g., divinylsulfone); and a (meth)acrylamide (e.g., methylenebisacrylamide).

Examples of the resin having two or more ethylenically unsaturated groups include a resin having a relatively low molecular weight, such as polyester resin, polyether resin, acrylic resin, epoxy resin, urethane resin, alkyd resin, spiroacetal resin, polybutadiene resin and polythiol polyene resin, and an oligomer or prepolymer of a polyfunctional compound such as polyhydric alcohol. Two or more kinds of these monomers may be used in combination. The resin having two or more ethylenically unsaturated groups is preferably contained in an amount of 10 to 100% based on the total amount of the binder.

The polymerization of such a monomer having ethylenically unsaturated groups can be performed by ionizing radiation or heating in the presence of a radical photopolymerization initiator or a radical thermal polymerization initiator Accordingly, a coating solution containing the monomer having ethylenically unsaturated groups, a radical photopolymerization initiator or radical thermal polymerization initiator and the particle and further containing, if desired, an inorganic filler, a coating aid, other additives, an organic solvent and the like, is prepared, and the coating solution is coated on a transparent support and cured by a polymerization reaction under ionizing radiation or heating to form an antiglare layer. It is also preferred to perform the polymerization by using ionizing radiation curing and heat curing in combination. As for the photopolymerization or thermal polymerization initiator, a commercially available compound may be used, and such a compound is described, for example, in Saishin Uv Koka Gijutsu (Latest UV Curing Technology), page 159, Kazuhiro Takausu (publisher), Technical Information Institute Co., Ltd. (publishing office) (1991), and catalogues of Ciba Specialty Chemicals Corp.

In the present invention, as regards the compound of the second group, the following epoxy-based compound is preferably used for reducing the curing shrinkage of the cured film. As for the monomers having an epoxy group, a monomer having two or more epoxy groups per molecule is preferred, and examples thereof include epoxy-based monomers described in JP-A-2004-264563, JP-A-2004-264564, JP-A-2005-37737, JP-A-2005-37738, JP-A-2005-140862, JP-A-2005-140863 and JP-A-2002-322430.

For reducing the curing shrinkage, it is preferred to contain the monomers having an epoxy group in an amount of 20 to 100 mass %, more preferably from 35 to 100 mass %, still more preferably from 50 to 100 mass %, based on all binders constituting the layer.

Examples of the photo-acid generator for generating a cation by the action of light to polymerize the epoxy monomers and compounds include an ionic compound such as triarylsulfonium salt and diaryliodonium salt, and a nonionic compound such as nitrobenzyl sulfonate. Various known photo-acid generators such as compounds described, for example, in Imaging Yo Yuki Zairyo (Organic Materials for Imaging), compiled by Yuki Electronics Zairyo Kenkyukai, Bunsin Shuppan-sha (1997) may be used. Above all, a sulfonium salt and an iodonium salt are preferred, and the counter ion is preferably, for example, $PF_6^-$, $SbF_6^-$, $AsF_6^-$ or $B(C_6F_5)_4^-$.

In the case where the film thickness of the antiglare layer is from 4 to 35 μm, in order to prevent curling due to curing shrinkage of the antiglare layer, the antiglare layer is preferably a layer formed from a polymer or copolymer composed of at least one member of the following (A1) and (A2) or from a mixed polymer component of the polymer and the copolymer.

(A1): An alkyl acrylate containing an alkyl group having at least either one group of a hydroxyl group and an acryloyl group.

(A2): An alkyl methacrylate containing an alkyl group having at least either one group of a hydroxyl group and an acryloyl group.

In the case of using such an antiglare layer-forming material, the degree of curling generated can be suppressed to be within 30 mm. The degree of curling generated is preferably within 20 mm, more preferably within 10 mm.

The alkyl group in (A1) and (A2) above is, for example, an alkyl group having a carbon number of 1 to 10 and may be linear or branched. The components (A1) and (A2) include, for example, a polymer or copolymer containing a repeating unit of the following formula (1) and a mixture of the polymer and the copolymer.

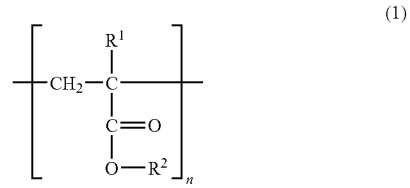

In formula (1), $R^1$ is —H or —$CH_3$, $R^2$ is —$CH_2CH_2OX$ or a group represented by the following formula (2), and X is —H or an acryloyl group represented by the following formula (3).

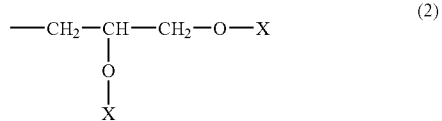

In formula (2), X is —H or an acryloyl group represented by the following formula (3), and Xs may be the same or different.

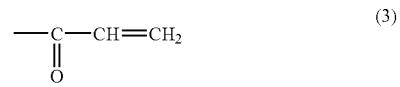

Examples of those components include a polymer or copolymer formed of at least one monomer selected from the group consisting of 2,3-dihydroxypropyl acrylate, 2,3-diacryloyloxypropyl acrylate, 2-hydroxy-3-acryloyloxypropyl acrylate, 2-acryloyloxy-3 -hydroxypropyl acrylate, 2,3-dihydroxypropyl methacrylate, 2,3-diacryloyloxypropyl methacrylate, 2-hydroxy-3-acryloyloxypropyl methacrylate, 2-acryloyloxy-3-hydroxypropyl methacrylate, 2-hydroxyethyl acrylate, 2-acryloyloxyethyl acrylate, 2-hydroxyethyl methacrylate and 2-acryloyloxy methacrylate, and a mixture of the polymer and the copolymer.

As for the layer-forming material containing a polymer or copolymer formed from at least either one of (A1) and (A2) or a mixed polymer component of the polymer and the copolymer, at least either one of urethane acrylate and urethane methacrylate and at least either one of polyol acrylate and polyol methacrylate are preferably mixed and used.

The polymerization initiator is preferably used, in terms of total amount of polymerization initiators, in the range from 0.1 to 15 parts by mass, more preferably from 1 to 10 parts by mass, per 100 parts by mass of the monomer above.

<Polymer Compound of Antiglare Layer>

The antiglare layer of the present invention may contain a polymer compound. By the addition of a polymer compound, the curing shrinkage may be reduced or the viscosity of the coating solution may be adjusted.

The polymer compound has already formed a polymer at the time of addition to the coating solution, and examples of the polymer compound which is preferably used include cellulose esters (e.g., cellulose triacetate, cellulose diacetate, cellulose propionate, cellulose acetate propionate, cellulose acetate butyrate, cellulose nitrate), urethane acrylates, polyester acrylates, (meth)acrylic acid esters (e.g., methyl methacrylate/methyl(meth)acrylate copolymer, methyl methacrylate/ethyl(meth)acrylate copolymer, methyl methacrylate/ butyl(meth)acrylate copolymer, methyl methacrylate/styrene copolymer, methyl methacrylate/(meth)acrylic acid copolymer, polymethyl methacrylate), and resins such as polystyrene.

In view of the effect on curing shrinkage or the effect of increasing the viscosity of the coating solution, the polymer compound is preferably contained in an amount of 1 to 50 mass %, more preferably from 5 to 40 mass %, based on all binders contained in the layer containing the polymer compound. Also, the molecular weight of the polymer compound is, in terms of the mass average molecular weight, preferably from 3,000 to 400,000, more preferably from 5,000 to 300,000, still more preferably from 5,000 to 200,000.

<Inorganic Filler of Antiglare Layer>

In addition to the light-transmitting resin particle above, the antiglare layer of the present invention may contain an inorganic filler according to the purpose such as control of the refractive index, adjustment of the film strength, reduction of the curing shrinkage and, in the case of providing a low refractive index layer, decrease in the reflectance. It is also preferred to contain a high refractive index inorganic microfiller that is composed of an oxide containing at least one metal element selected from titanium, zirconium, aluminum, indium, zinc, tin and antimony and has an average primary particle diameter of generally 0.2 μm or less, preferably 0.1 μm or less, more preferably from 1 nm to 0.06 μm.

In the case where the refractive index of the matrix needs to be decreased to adjust the refractive index difference from the light-transmitting resin particle, a low refractive index inorganic microfiller such as silica fine particle or hollow silica fine particle may be used as the inorganic filler. The preferred particle diameter thereof is the same as that of the above-described high refractive index inorganic microfiller.

It is also preferred that the surface of the inorganic filler is subjected to a silane coupling treatment or a titanium coupling treatment. A surface-treating agent having a functional group capable of reacting with the binder species on the filler surface is preferably used.

The amount of the inorganic filler added is preferably from 10 to 90 mass %, more preferably from 20 to 80 mass %, still more preferably from 30 to 75 mass %, based on the entire mass of the antiglare layer.

Incidentally, the inorganic filler has a particle diameter sufficiently smaller than the light wavelength and therefore, causes no scattering, and a dispersion obtained by dispersing the filler in the binder polymer has a property as an optically uniform substance.

<Surfactant of Antiglare Layer>

In the antiglare layer of the present invention, in order to ensure the surface state uniformity particularly in terms of coating unevenness, drying unevenness, point defect and the like, the coating composition for antiglare layer preferably contains either one or both of a fluorine-containing surfactant and a silicone-containing surfactant. Above all, a fluorine-containing surfactant is preferably used, because an effect of improving a surface failure such as coating unevenness, drying unevenness and point defect in the antiglare film of the present invention is brought out with a smaller amount added. The purpose is to impart suitability for high-speed coating while elevating the surface state uniformity and thereby raise the productivity. Preferred examples of the fluorine-containing surfactant include the compounds described in JP-A-2007-188070, paragraphs [0049] to [0074].

The added amount of the surfactant (particularly a fluorine-containing polymer) for use in the antiglare layer of the present invention is preferably from 0.001 to 5 mass %, more preferably from 0.005 to 3 mass %, still more preferably from 0.01 to 1 mass %, based on the coating solution. When the amount of the surfactant added is 0.001 mass % or more, a sufficient effect can be obtained, and when the added amount is 5 mass % or less, drying of the coating film can be sufficiently effected and good performance as a coating film (for example, reflectance and scratch resistance) can be obtained.

<Organic Solvent of Coating Solution for Antiglare Layer>

An organic solvent can be added to the coating composition for forming the antiglare layer.

Examples of the organic solvent include an alcohol-based organic solvent such as methanol, ethanol, n-propanol, isopropanol, n-butanol, isobutanol, secondary butanol, tertiary butanol, isoamyl alcohol, 1-pentanol, n-hexanol and methyl amyl alcohol; a ketone-based organic solvent such as methyl isobutyl ketone, methyl ethyl ketone, diethyl ketone, acetone, cyclohexanone and diacetone alcohol; an ester-based organic solvent such as methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl acetate, methyl lactate and ethyl lactate; an ether- or acetal-based organic solvent such as 1,4-dioxane, tetrahydrofuran, 2-methylfuran, tetrahydropyrane and diethylacetal; a hydrocarbon-based organic solvent such as hexane, heptane, octane, isooctane, ligroin, cyclohexane, methylcyclohexane, toluene, xylene, ethylbenzene, styrene and divinylbenzene; a hydrocarbon halide-based organic solvent such as carbon tetrachloride, chloroform, methylene chloride, ethylene chloride, 1,1,1-trichloroethane, 1,1,2-trichloroethane, trichloroethylene, tetrachloroethylene and 1,1,1,2-tetrachloroethane; a polyhydric alcohol- or its derivative-based organic solvent such as ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentanediol, glycerin monoacetate, glycerin ethers and 1,2,6-hexanetriol; a fatty acid-based organic solvent such as formic acid, acetic acid, propionic acid, butyric acid, isobutyric acid, isovaleric acid and lactic acid; a nitrogen compound-based organic solvent such as formamide, N,N-dimethylformamide, acetamide and acetonitrile; and a sulfur compound-based organic solvent such as dimethylsulfoxide.

Among these organic solvents, preferred are methyl isobutyl ketone, methyl ethyl ketone, cyclohexanone, acetone, toluene, xylene, ethyl acetate and 1-pentanol. Also, for the purpose of controlling the aggregating property, an alcohol-based or polyhydric alcohol-based solvent may be appropriately mixed and used. One of these organic solvents may be used alone or a mixture thereof may be used. In the coating composition, the organic solvent is preferably contained in an amount of, in terms of the total amount of organic solvents, from 20 to 90 mass %, more preferably from 30 to 80 mass %, and most preferably from 40 to 70 mass %. In order to stabilize the surface profile of the antiglare layer, a solvent having a boiling point of less than 100° C. and a solvent having a boiling point of 100° C. or more are preferably used in combination.

<Curing of Antiglare Layer>

The antiglare layer can be formed by applying the coating solution on a support and subjecting the coating to light irradiation, electron beam irradiation, heat treatment or the like to cause a crosslinking or polymerization reaction. In the case of ultraviolet irradiation, an ultraviolet ray emitted from a light source such as ultrahigh-pressure mercury lamp, high-pressure mercury lamp, low-pressure mercury lamp, carbon arc, xenon arc or metal halide lamp may be utilized. As for the curing with ultraviolet ray, the curing is preferably performed in an atmosphere adjusted to an oxygen concentration of 4 vol % or less, more preferably 2 vol % or less, and most preferably 0.5 vol % by volume or less, by nitrogen purging or the like.

Layers other than the antiglare layer are described below.

<Surface Conditioning Layer>

In the present invention, a surface conditioning layer may be formed for conditioning the uneven surface of the antiglare layer. The surface conditioning layer can form smooth irregularities by filling and smoothing fine irregularities present along the uneven geometry on a scale of 1/10 or less of the irregularity scale (peak height and peak-to-peak distance of irregularities) in the surface roughness forming the uneven geometry of the antiglare layer or can adjust the peak-to-peak distance or peak height of irregularities or the frequency (number) of peaks. By providing the surface conditioning layer, the arithmetic mean roughness Ra of the antiglare layer can be reduced by 0.04 μm or more. The film thickness (at the curing) of the surface conditioning layer is from 0.5 to 12 μm. Preferably, the lower limit is 3 μm or more and the upper limit is 8 μm or less.

<Low Refractive Index Layer>

The antiglare film of the present invention preferably has a low refractive index layer for reducing the reflectance. The refractive index of the low refractive index layer is preferably from 1.20 to 1.46, more preferably from 1.25 to 1.46, still more preferably from 1.30 to 1.40. The thickness of the low refractive index layer is preferably from 50 to 200 nm, more preferably from 70 to 100 nm. The haze of the low refractive index layer is preferably 3% or less, more preferably 2% or less, and most preferably 1% or less.

Preferred embodiments of the formulation for the cured product working out to the low refractive index layer include:

(1) a composition containing a fluorine-containing compound having a crosslinking or polymerizable functional group;

(2) a composition with the main component being a hydrolysis condensate of a fluorine-containing organosilane material; and (3) a composition containing a monomer having two or more ethylenically unsaturated groups and an inorganic fine particle having a hollow structure.

(1) Composition Containing Fluorine-Containing Polymer Having Crosslinking or Polymerizable Functional Group The fluorine-containing compound having a crosslinking or polymerizable functional group includes a copolymer of a fluorine-containing monomer with a monomer having a crosslinking or polymerizable functional group. Specific examples of the fluorine-containing polymer are described, for example, in JP-A-2003-222702 and JP-A-2003-183322.

As described in JP-A-2000-17028, a curing agent having a polymerizable unsaturated group may be appropriately used in combination with the above-described polymer. Also, as described in JP-A-2002-145952, a combination use with a fluorine-containing compound having a polyfunctional polymerizable unsaturated group is preferred. Examples of the compound having a polyfunctional polymerizable unsaturated group include the above-described monomers having two or more ethylenically unsaturated groups. Furthermore, a hydrolysis condensate of an organosilane described in JP-A-2004-170901 is also preferred, and a hydrolysis condensate of an organosilane containing a (meth)acryloyl group is more preferred. These compounds are preferred because a great effect is brought out on the scratch resistance by the combination use particularly when the polymerizable unsaturated group-containing compound is used in the polymer body.

In the case where the polymer used alone has no sufficient curability by itself, the necessary curability can be imparted by blending a crosslinking compound. For example, when the polymer body contains a hydroxyl group, various amino compounds are preferably used as the curing agent. The amino compound used as the crosslinking compound is, for example, a compound having two or more groups in total of either one or both of a hydroxyalkylamino group and an alkoxyalkylamino group, and specific examples thereof include a melamine-based compound, a urea-based compound, a benzoguanamine-based compound and a glycoluril-based compound. For the curing of such a compound, an organic acid or a salt thereof is preferably used.

(2) Composition with Main Component Being Hydrolysis Condensate of Fluorine-Containing Organosilane Material A composition with the main component being a hydrolysis condensate of a fluorine-containing organosilane compound is also preferred, because its refractive index is low and the hardness of the coating film surface is high. A condensate between a compound having hydrolyzable silanol at one end or both ends with respect to a fluorinated alkyl group and a tetraalkoxysilane is preferred. Specific examples of the composition are described in JP-A-2002-265866 and JP-A-2002-317152.

(3) Composition Containing Monomer Having Two or More Ethylenically Unsaturated Groups and Inorganic Fine Particle Having Hollow Structure A still another preferred embodiment is a low refractive index layer composed of a low refractive index particle and a binder. The low refractive index particle may be either organic or inorganic but is preferably a particle having a void in the inside, more preferably a hollow silica particle. Specific examples of the hollow particle include silica-based particles described in JP-A-2002-79616. The refractive index of the particle is preferably from 1.15 to 1.40, more preferably from 1.20 to 1.30. Examples of the binder include monomers having two or more ethylenically unsaturated groups, which are described above for the antiglare layer.

In the low refractive index layer of the present invention, a polymerization initiator described above for the antiglare layer is preferably added. In the case of containing a radical polymerizable compound, the polymerization initiator can be used in an amount of 1 to 10 parts by mass, preferably from 1 to 5 parts by mass, based on the compound.

In the low refractive index layer of the present invention, an inorganic particle can be used in combination. For imparting scratch resistance, a fine particle having a particle diameter of 15 to 150%, preferably from 30 to 100%, more preferably from 45 to 60%, of the thickness of the low refractive index layer may be used.

In the low refractive index layer of the present invention, a known polysiloxane-based or fluorine-based antifouling agent, a slipping agent and the like may be appropriately added for the purpose of imparting properties such as antifouling property, water resistance, chemical resistance and slipperiness.

In the present invention, the integrated reflectance of the antireflection antiglare film in which a low refractive index layer and the like are provided is preferably 3.0% or less, more preferably 2.0% or less, and most preferably from 0.3 to 1.5%. By decreasing the integrated reflectance, a sufficient antiglare property is obtained even when the light scattering on the antiglare film surface is reduced, so that an antiglare antireflection film excellent in the denseness of black can be obtained.

<Transparent Support>

The transparent support for use in the antiglare film of the present invention is preferably a plastic film. Examples of the polymer forming the plastic film include a cellulose acrylate (e.g., triacetyl cellulose, diacetyl cellulose; representatively, TAC-TD80U, TD80UF and the like produced by Fujifilm Corp.), a polyamide, a polycarbonate, a polyester (e.g., polyethylene terephthalate, polyethylene naphthalate), a polystyrene, a polyolefin, a norbornene-based resin (ARTON, trade name, produced by JSR Corp.), an amorphous polyolefin (ZEONEX, trade name, produced by Zeon Corp.), and a (meth)acrylic resin (ACRYPET VRL20A, trade name, produced by Mitsubishi Rayon Co., Ltd., and ring structure-containing acrylic resins described in JP-A-2004-70296 and JP-A-2006-171464). Among these, triacetyl cellulose, polyethylene terephthalate and polyethylene naphthalate are preferred, and triacetyl cellulose is more preferred.

In the case of using the antiglare film of the present invention for a liquid crystal display device, the antiglare film is disposed on the outermost surface of the display, for example, by providing an adhesive layer on one surface. The antiglare film of the present invention may be combined with a polarizing plate. In the case where the transparent support is triacetyl cellulose, since triacetyl cellulose is used as a protective film for protecting the polarizing film of the polarizing plate, it is preferred in view of the cost to directly use the antiglare film of the present invention for a protective film.

In the case where the antiglare film of the present invention is disposed on the outermost surface of the display, for example, by providing an adhesive layer on one surface or is directly used as a polarizing plate protective film, for ensuring sufficient adhesion, the transparent substrate after forming the outermost layer is preferably subjected to a saponification treatment. The saponification treatment is performed by a known method, for example, by dipping the film in an alkali solution for an appropriate time. After the dipping in an alkali solution, the film is preferably thoroughly washed with water or dipped in a dilute acid to neutralize alkali components so as not to allow alkali components to remain in the film.

The surface of the transparent support on the side opposite the surface having the outermost layer is made hydrophilic by the saponification treatment.

<Coating Method>

The antiglare film of the present invention can be formed by the following method, but the present invention is not limited to this method. First, a coating solution containing components for forming each layer is prepared. Next, the coating solution for forming various functional layers is coated on a transparent support by a dip coating method, an air knife coating method, a curtain coating method, a roller coating method, a wire bar coating method, a gravure coating method or a die coating method and then heated/dried. A microgravure coating method, a wire bar coating method and a die coating method (see, U.S. Pat. No. 2,681,294 and JP-A-2006-122889) are preferred, and a die coating method is more preferred.

Thereafter, the monomers for forming the functional layer are polymerized and cured by light irradiation or heating, whereby the functional layer is formed. Here, a plurality of functional layers may be provided, if desired.

Subsequently, the coating solution for forming a low refractive index layer is coated on the functional layer and irradiated with light or heated in the same manner (that is, cured by irradiating ionizing radiation such as ultraviolet ray, preferably by irradiating ionizing radiation under heating) to form a low refractive index layer. In this way, the antireflection film of the present invention is obtained.

<Polarizing Plate>

The polarizing plate is mainly composed of two protective films for protecting both surfaces on the front and back sides of a polarizing film. The antiglare film or antireflection film of the present invention is preferably used for at least one of those two protective films sandwiching the polarizing film from both surfaces. By using the antiglare film or antireflection film of the present invention to serve also as a protective film, the production cost of the polarizing plate can be reduced. Also, by using the antiglare film or antireflection film of the present invention as the outermost layer, disturbing reflection or the like of outside light can be prevented and a polarizing plate excellent also in the scratch resistance, antifouling property and the like can be obtained.

The hydrophilized surface is effective particularly in improving the adhesion to a polarizing film comprising polyvinyl alcohol as the main component. Also, the hydrophilized surface hardly allows attachment of dusts in the air and therefore, dusts scarcely intrude between the polarizing film and the antiglare film when adhering the antiglare film to the polarizing film, which is effective in preventing point defects due to dusts.

The saponification treatment is preferably performed such that the contact angle for water of the transparent substrate surface opposite the surface having the outermost layer becomes 40° or less, more preferably 30° or less, still more preferably 20° or less.

<Image Display Device>

The antiglare film of the present invention can be applied to an image display device such as liquid crystal display device (LCD), plasma display panel (PDP), electroluminescent display (ELD), cathode ray tube display (CRT) and surface-conduction electron-emitter display (SED). In particular, the antiglare film is preferably used for a liquid crystal display (LCD). The antiglare film or antireflection film of the present invention has a transparent support and therefore, is used by adhering the transparent support side to the image display surface of the image display device.

In the case of use as a surface protective film on one side of a polarizing film, the antiglare film or antireflection film of the present invention can be preferably used for a transmissive, reflective or transflective liquid crystal display device in a mode such as twisted nematic (TN), super twisted nematic (STN), vertical alignment (VA), in-plane switching (IPS) and optically compensated bend cell (OCB).

EXAMPLES

The present invention is described in greater detail below by referring to Examples, but the present invention is not limited thereto. Incidentally, unless otherwise indicated, the "parts" and "%" are on the mass basis.

Formulation of Coating Solution A-1 for Antiglare Layer:

| | |
|---|---|
| PET-30 | 76.3 g |
| IRGACURE 127 | 3.0 g |
| Liquid dispersion of 8-μm crosslinked acryl particle (30%) | 18.4 g |
| Liquid dispersion of 8-μm crosslinked acryl/styrene particle (30%) | 48.3 g |
| SP-13 | 0.2 g |
| CAB | 0.5 g |
| Methyl isobutyl ketone (MIBK) | 72.6 g |
| Methyl ethyl ketone (MEK) | 32.5 g |

Formulation of Coating Solution A-2 for Antiglare Layer:

| | |
|---|---|
| PET-30 | 88.3 g |
| IRGACURE 127 | 3.0 g |
| Liquid Dispersion of 8-μm crosslinked acryl particle (30%) | 25.7 g |
| Liquid dispersion of 12-μm crosslinked acryl/styrene particle (30%) | 0.9 g |
| SP-13 | 0.2 g |
| CAB | 0.5 g |
| MIBK | 72.6 g |
| MEK | 32.5 g |

Formulation of Coating Solution A-3 for Antiglare Layer:

| | |
|---|---|
| PET-30 | 84.5 g |
| IRGACURE 127 | 1.5 g |
| KBM-5103 | 6.2 g |
| Liquid dispersion of 3.5-μm crosslinked styrene particle (30%) | 13.0 g |
| Liquid dispersion of 3.5-μm crosslinked acryl/styrene particle (30%) | 13.0 g |
| SP-13 | 0.04 g |
| MIBK | 31.0 g |

Formulation of Coating Solution A-4 for Antiglare Layer:

| | |
|---|---|
| DPHA | 14.8 g |
| PET-30 | 19.6 g |
| GRANDIC PC7-3201F | 17.8 g |
| EB 1290K | 30.2 g |
| IRGACURE 127 | 3.0 g |
| Liquid dispersion of 8-μm crosslinked acryl/styrene particle (30%) | 48.3 g |
| SP-13 | 0.1 g |
| Butyl acetate | 21.2 g |
| Ethyl acetate | 45.0 g |

These coating solutions for antiglare layer each was filtered through a polypropylene-made filter having a pore size of 30 μm to prepare a coating solution. In the coating solutions above, the refractive index of the matrix (refractive index of the antiglare layer film excluding the light-transmitting resin particle) after curing was 1.525.

Here, the refractive index of the antiglare layer film excluding the light-transmitting particle was measured directly by an Abbe refractometer. Also, the refractive index of the light-transmitting resin particle was determined by a method where the light-transmitting particles were dispersed in equal amounts in solvents prepared by changing the mixing ratio of two kinds of arbitrary solvents differing in the refractive index selected from methylene iodide, 1,2-dibromopropane and n-hexane and thereby varying the refractive index, the turbidity was measured, and the refractive index of the solvent when the turbidity became minimum was measured by an Abbe refractometer.

Formulation of Coating Solution L-1 for Low Refractive Index Layer

| | |
|---|---|
| Fluorine-containing polymer containing an ethylenically unsaturated group (A-1) | 3.9 g |
| Silica Liquid Dispersion A (22%) | 25.0 g |
| IRGACURE 127 | 0.2 g |
| DPHA | 0.4 g |
| MEK | 100.0 g |
| MIBK | 45.5 g |

The coating solution for low refractive index layer above was filtered through a polypropylene-made filter having a pore size of 1 μm to prepare a coating solution. The refractive index after curing of the low refractive index layer formed by coating and curing the coating solution was 1.360.

The compounds used are as follows.
PET-30:
A mixture of pentaerythritol triacrylate and pentaerythritol tetraacrylate [produced by Nippon Kayaku Co., Ltd.].
DPHA:
A mixture of dipentaerythritol pentaacrylate and dipentaerythritol hexaacrylate [produced by Nippon Kayaku Co., Ltd.]
KBM-5103:
An organosilane compound [produced by Shin-Etsu Chemical Co., Ltd.]
GRANDIC PC7-3201F:
A hydroxyl group-containing acrylate monomer [produced by DIC Corp.]
EB1290K:
A urethane acrylate monomer [produced by DAICEL-CYTEC Company Ltd.]
Liquid dispersion of 8-μm crosslinked acryl particle (30%):
A liquid dispersion in MIBK, obtained by dispersing crosslinked acryl particles having an average particle diameter of 8.0 μm [produced by Soken Chemical & Engineering Co.] by means of a Polytron disperser at 10,000 rpm for 20 minutes. Liquid dispersion of 8-μm crosslinked acryl/styrene particle (30%):
A liquid dispersion in MIBK, obtained by dispersing crosslinked acryl/styrene particles having an average particle diameter of 8.0 μm and a refractive index of 1.555 by means of a Polytron disperser at 10,000 rpm for 20 minutes.
Liquid dispersion of 12-μm crosslinked acryl/styrene particle (30%):
A liquid dispersion in MIBK, obtained by dispersing crosslinked acryl/styrene particles having an average particle diameter of 12.0 μm and a refractive index of 1.570 by means of a Polytron disperser at 10,000 rpm for 20 minutes.
Liquid dispersion of 3.5-μm crosslinked styrene particle (30%):
A dispersion in cyclohexanone, obtained by dispersing crosslinked styrene particles having an average particle diameter of 3.5 μm and a refractive index of 1.60 [produced by Soken Chemical & Engineering Co., Ltd.] by means of a Polytron disperser at 10,000 rpm for 20 minutes.
Liquid dispersion of 3.5-μm crosslinked acryl/styrene particle (30%):
A liquid dispersion in cyclohexanone, obtained by dispersing crosslinked acryl/styrene particles having an average particle diameter of 3.5 μm and a refractive index of 1.550) by means of a Polytron disperser at 10,000 rpm for 20 minutes.
IRGACURE 127:
A photopolymerization initiator [produced by Ciba Specialty Chemicals Corp.]
CAB:
Cellulose acetate butyrate
Fluorine-containing polymer containing an ethylenically unsaturated group (A-1):
Fluoropolymer (A-1) described in Production Example 3 of JP-A-2005-89536
SP-13:
A fluorine-containing surfactant (used after dissolving it as a 10 mass % solution in MEK)

(Silica Liquid Dispersion A)

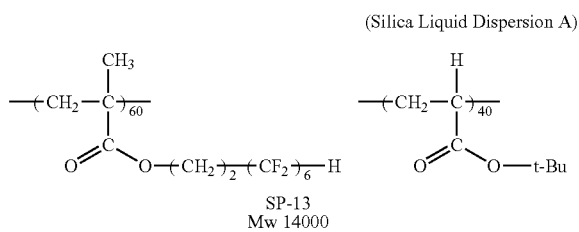

SP-13
Mw 14000

After adding and mixing 10 g of acryloyloxypropyltrimethoxysilane (produced by Shin-Etsu Chemical Co., Ltd.) and 1.0 g of diisopropoxyaluminum ethyl acetate to 500 g of a hollow silica fine particle sol (isopropyl alcohol silica sol, average particle diameter: 60 nm, thickness of shell: 10 nm, silica concentration: 20 mass %, refractive index of silica particle: 1.31, prepared according to Preparation Example 4 of JP-A-2002-79616 by changing the particle size), 3 g of ion-exchanged water was added thereto. Subsequent to the reaction at 60° C. for 8 hours, the reaction solution was cooled to room temperature and 1.0 g of acetyl acetone was added thereto. While adding cyclohexanone to 500 g of the resulting liquid dispersion to keep almost constant the silica content, solvent replacement by reduced-pressure distillation was performed. Extraneous substances were not generated in the liquid dispersion and when the solid content concentration was adjusted to 22 mass % with cyclohexanone, the viscosity was 5 mPa·s at 25° C. The amount of isopropyl alcohol remaining in the obtained Liquid Dispersion A was analyzed by gas chromatography and found to be 1.0%.

[Preparation of Coating Solutions for Antiglare Layer]

Coating solutions prepared by, with respect to Coating Solutions (A-1) to (A-4) for Antiglare Layer, adding a copolymerization product to a particle liquid dispersion as shown in Table 1 and additionally dispersing these by a Polytron disperser at 10,000 rpm for 5 minutes were used.

The compounds used are as follows.

Disperbyk 2000:

A commercial product of an A-B block copolymerization product having a block structural unit derived from a methacrylic acid ester (block B) and a block structural unit derived from a monomer containing a quaternary ammonium salt group of the following structure in a methacrylic acid-derived side chain (block A); mass average molecular weight (Mw): about 3,500, amount of quaternary ammonium salt group per 1 g of dispersant: 1.75 mmol, amine value: 4 mgKOH/g, acid value: 0 mgKOH/g [produced by BYK-Chemie]

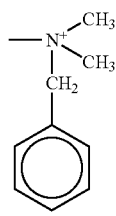

Disperbyk 161:
A block copolymerization product, amine value: 11 mgKOH/g, acid value: 0 mgKOH/g [produced by BYK-Chemie]

Disperbyk 171:
A block copolymerization product, amine value: 0 mgKOH/g, acid value: 13 mgKOH/g [produced by BYK-Chemie]

Disperbyk 163:
A block copolymerization product, amine value: 10 mgKOH/g, acid value: 0 mgKOH/g [produced by BYK-Chemie]

Disperbyk 184:
A block copolymerization product, amine value: 15 mgKOH/g, acid value: 0 mgKOH/g [produced by BYK-Chemie]

Disperbyk 140:
An alkyl ammonium salt of an acidic polymer, amine value: 76 mgKOH/g, acid value: 73 mgKOH/g [produced by BYK-Chemie]

Disperbyk 142:
A phosphoric acid ester salt of a copolymerization product, amine value: 43 mgKOH/g, and an acid value: 46 mgKOH/g [produced by BYK-Chemie]

Disperbyk 108:
A hydroxyl group-containing carboxylic acid ester, amine value: 71 mgKOH/g, and an acid value: 0 mgKOH/g [produced by BYK-Chemie]

Example 1

Production of Antiglare Antireflection Film Samples 101 to 117:

(1) Coating of Antiglare Layer

A 80 μm-thick triacetyl cellulose film (TAC-TD80U, produced by Fujifilm Corp.) in a roll form was unrolled, and a coating solution for antiglare layer shown in Table 1 was coated thereon by a die coating method using the slot die described in Example 1 of JP-A-2006-122889 under the condition of a conveying speed of 30 m/min and dried at 60° C. for 150 seconds. Thereafter, the coated layer was cured by irradiating an ultraviolet ray thereon at an illuminance of 400 mW/cm$^2$ and an irradiation dose of 300 mJ/cm$^2$ with use of an air-cooled metal halide lamp (manufactured by Eye Graphics Co., Ltd.) of 160 W/cm under nitrogen purging to an oxygen concentration of about 0.1%, and the resulting film was taken up. The coated amount was adjusted to give the value shown in Table 1 for the film thickness of each antiglare layer.

(2) Coating of Low Refractive Index Layer

The triacetyl cellulose film after forming the antiglare layer was again unrolled, and the coating solution for low refractive index layer was coated thereon by a die coating method using the above-described slot die under the condition of a conveying speed of 30 m/min and dried at 90° C. for 75 seconds. Thereafter, an ultraviolet ray at an illuminance of 400 mW/cm$^2$ and an irradiation dose of 240 mJ/cm$^2$ was irradiated using an air-cooled metal halide lamp (manufactured by Eye Graphics Co., Ltd.) of 240 W/cm under nitrogen purging to an oxygen concentration of 0.01 to 0.1% to form a low refractive index layer of 100 nm in thickness, and the resulting film was taken up. In this way, an antiglare antireflection film was produced.

(Saponification Treatment of Antiglare Antireflection Film)

Samples after coating were subjected to the following treatment. An aqueous 1.5 mol/L sodium hydroxide solution was prepared and kept at 55° C. Separately, an aqueous 0.01 mol/L dilute sulfuric acid solution was prepared and kept at 35° C. The antiglare antireflection film produced was dipped in the aqueous sodium hydroxide solution for 2 minutes and then dipped in water to thoroughly wash out the aqueous sodium hydroxide solution. Subsequently, the film was dipped in the aqueous dilute sulfuric acid solution for 1 minute and then dipped in water to thoroughly wash out the aqueous dilute sulfuric acid solution. Finally, the sample was thoroughly dried at 120° C. In this way, a saponified antiglare antireflection film (Samples 101 to 117) was produced.
(Production of Polarizing Plate)

A 80 μm-thick triacetyl cellulose film (TAC-TD80U, produced by Fujifilm Corp.) which had been dipped in an aqueous 1.5 mol/liter NaOH solution at 55° C. for 2 minutes, neutralized and then washed with water, and the saponified optical film (Samples 101 to 117) were respectively adhered for protection to both surfaces of a polarizing film produced by adsorbing iodine to polyvinyl alcohol and stretching the film, whereby a polarizing plate was produced.
(Evaluation of Optical Film and Polarizing Plate)

These samples obtained were evaluated for the following items. The results are shown in Table 1.
(1) Haze The entire haze value (H) of the obtained optical film sample was measured in accordance with JIS-K7136.
(2) Integrated Reflectance
[Integrated Reflectance]

The back surface of the film was roughened with sand paper and then treated with black ink to eliminate the back surface reflection and in this state, the integrated spectral reflectance on the front surface side was measured at an incident angle of 5° in the wavelength region of 380 to 780 nm by using a spectrophotometer "V-550" (manufactured by JASCO Corporation). For the result, an arithmetic mean value of the integrated reflectance at 450 to 650 nm was used. An integrated reflectance of 2.0% or less is enough to obtain a sufficient antireflection performance, and a smaller value is better.
(3) Denseness of Black With respect to a liquid crystal display device where a polarizing plate laminated with the film was disposed on the viewing side surface, sensory evaluation was performed for the denseness of black. The evaluation was performed by a method of juxtaposing a plurality of display units and relatively comparing these at the same time. The tint of black at the power-off time and the tint of black (black image) at the power-on time each viewed from the frontal side were compared among respective film samples and evaluated according to the following criteria. The criteria are based on the understanding that as the tint of black is stronger, the denseness of the screen is higher.

A: Strong tint of black, and the screen appears very dense.
B: Strong tint of black, and the screen appears dense.
C: Black but gray tinted, and the denseness of the screen is low.
D: Fairly strong tint of gray, and the screen lacks denseness.
(4) Antiglare Property The entire surface on the back side of the coated surface of the obtained film was blacked out with a black marker, and the degree of blurring of the reflected image when a bare fluorescent lamp (8,000 cd/m$^2$) without louver was projected from an angle of 5° and observed from the direction of −5° and when projected from an angle of 45° and observed from the direction of −45°, was evaluated according to the following criteria.

A: The contour of the fluorescent lamp was only slightly observed in both cases of −5 and −45°.
B: The contour of the fluorescent lamp was only slightly observed in the case of −5°, but the contour was relatively clearly observed in the case of −45°.
C: The contour of the fluorescent lamp was relatively clearly observed in both cases of −50 and −45°.
D: The contour of the fluorescent lamp was clearly observed in both cases of −5° and −45° or the reflected image was glaring.
(5) Adherence Test The obtained film sample was subjected to a crosscut tape peeling test in accordance with JIS D0202-1988. Using a cellophane tape ("CT24", produced by Nichiban Co., Ltd.), the tape was adhered to the film by the ball of a finger and then peeled off. The adherence was rated by the number of non-peeled squares out of 100 squares and expressed by 100/100 when the functional layer was not peeled off, and by 0/100 when the functional layer was completely peeled off.
(6) Surface Roughness The arithmetic mean roughness (Ra) (μm) was measured in accordance with JIS-B0601 (2001) by using SURFCORDER MODEL SE-3500 manufactured by Kosaka Laboratory Ltd.

Evaluation results of each sample are shown in Table 1.

TABLE 1

| Sample No. | Coating Solution for Antiglare Layer | Species of Copolymerization Product | Amount of Copolymerization Product Added (based on light-transmitting resin) | Film Thickness of Antiglare Layer | Remarks |
|---|---|---|---|---|---|
| 101 | A-1 | — | — | 13 | Comparative Example |
| 102 | A-1 | Disperbyk-2000 | 0.5 wt % | 13 | Invention |
| 103 | A-1 | Disperbyk-2000 | 0.3 wt % | 13 | Invention |
| 104 | A-1 | Disperbyk-2000 | 5 wt % | 13 | Invention |
| 105 | A-1 | Disperbyk-161 | 2 wt % | 13 | Invention |
| 106 | A-1 | Disperbyk-171 | 5 wt % | 13 | Comparative Example |
| 107 | A-1 | Disperbyk-163 | 5 wt % | 13 | Invention |
| 108 | A-1 | Disperbyk-184 | 1 wt % | 13 | Invention |
| 109 | A-1 | Disperbyk-140 | 5 wt % | 13 | Comparative Example |
| 110 | A-1 | Disperbyk-142 | 2 wt % | 13 | Comparative Example |
| 111 | A-1 | Disperbyk-108 | 2 wt % | 13 | Comparative Example |
| 112 | A-2 | — | — | 12 | Comparative Example |
| 113 | A-2 | Disperbyk-2000 | 2 wt % | 11 | Invention |
| 114 | A-3 | — | — | 5 | Comparative Example |
| 115 | A-3 | Disperbyk-2000 | 5 wt % | 5 | Comparative Example |
| 116 | A-4 | — | — | 25 | Comparative Example |
| 117 | A-4 | Disperbyk-2000 | 1 wt % | 25 | Invention |

TABLE 1-continued

| Sample No. | Haze (%) | Integrated Reflectance (%) | Denseness of Black | Antiglare Property | Adherence | Arithmetic Mean Roughness Ra (μm) | Remarks |
|---|---|---|---|---|---|---|---|
| 101 | 23 | 2.19 | C | A | 100/100 | 0.19 | Comparative Example |
| 102 | 23 | 1.87 | A | B | 100/100 | 0.13 | Invention |
| 103 | 23 | 1.91 | B | A | 100/100 | 0.15 | Invention |
| 104 | 23 | 1.85 | A | B | 100/100 | 0.13 | Invention |
| 105 | 24 | 1.86 | A | B | 100/100 | 0.13 | Invention |
| 106 | 24 | 2.20 | C | A | 100/100 | 0.13 | Comparative Example |
| 107 | 26 | 1.93 | B | A | 91/100 | 0.15 | Invention |
| 108 | 25 | 1.95 | B | A | 86/100 | 0.16 | Invention |
| 109 | 24 | 2.39 | D | A | 52/100 | 0.21 | Comparative Example |
| 110 | 23 | 2.18 | C | A | 100/100 | 0.19 | Comparative Example |
| 111 | 23 | 2.21 | C | A | 100/100 | 0.20 | Comparative Example |
| 112 | 13 | 2.11 | C | B | 100/100 | 0.13 | Comparative Example |
| 113 | 13 | 1.54 | A | B | 100/100 | 0.03 | Invention |
| 114 | 42 | 1.94 | D | A | 100/100 | 0.22 | Comparative Example |
| 115 | 42 | 1.93 | D | A | 100/100 | 0.21 | Comparative Example |
| 116 | 25 | 1.81 | B | C | 100/100 | 0.10 | Comparative Example |
| 117 | 25 | 1.78 | A | C | 100/100 | 0.08 | Invention |

The results shown in Table 1 reveal the followings. In the film of the present invention, optical performances (integrated reflectance, denseness of black, antiglare property) as the antiglare antireflection film are in preferred ranges. Also, the film of the present invention is excellent in the adherence. In Sample Nos. 102 to 104, 113 and 117 using a modified acrylic block copolymerization product, the transparency of the coating film is excellent without causing an increase of haze compared with those where the copolymerization product is not added. Furthermore, the arithmetic mean roughness is decreased as compared with those where the copolymerization product according to the present invention is not added, revealing that the aggregating property of the particle is reduced. In addition, in the case of a particle having an average particle diameter of less than 6 μm, the optical performances are scarcely changed even when a modified acrylic block copolymerization product is used, and this indicates that the effect is prominent when the average particle diameter of the light-transmitting resin particle is from 6 to 20 μm.

Example 2

A 80 μm-thick triacetyl cellulose film (TD80U, produced by Fujifilm Corp.) which had been dipped in an aqueous 1.5 mol/liter NaOH solution at 55° C. for 2 minutes, neutralized and then washed with water, and the sample (saponified film) of the present invention produced in Example 1 were adhered for protection to both surfaces of a polarizing film produced by adsorbing iodine to polyvinyl alcohol and stretching the film, whereby a polarizing plate was produced. The thus-produced polarizing plate was laminated to replace the polarizing plate on the viewing side of a high vision liquid crystal television set LC-20AX5 manufactured by Sharp Corp. such that the side having a low refractive index layer became the outermost surface. It was found that the display device using the film of the present invention exhibits high denseness of black. Furthermore, the film of the present invention was found to give high display contrast and less glaring as an antiglare antireflection film.

Example 3

Each film of the samples of the present invention produced in Example 1 was laminated to the glass plate on the surface of an organic EL display device through a pressure-sensitive adhesive, as a result, the reflection on the glass surface was suppressed and a display device having high visibility and high denseness of black was obtained.

Example 4

A polarizing plate having the film of the present invention on one surface was produced using each film of the samples of the present invention produced in Example 1, a λ/4 plate was laminated to the polarizing plate surface opposite the surface having the film of the present invention, and the polarizing plate was laminated to the glass plate on the surface of an organic EL display device such that the surface on the side having the film of the present invention became the outermost surface, as a result, the surface reflection and reflection from the inside of the surface glass were cut and a display device having very high visibility and high denseness of black was obtained.

According to the present invention, an antiglare film excellent in the denseness of black and the antiglare property can be provided. Also, an antireflection film, a polarizing plate and an image display device, each having the antiglare film, can be provided.

The entire disclosure of each and every foreign patent application from which the benefit of foreign priority has been claimed in the present application is incorporated herein by reference, as if fully set forth.

What is claimed is:

1. An antiglare film, comprising:
a transparent support; and
an antiglare layer,
wherein the antiglare layer contains a light-transmitting resin particle, a light-transmitting resin and a copolymerization product having an amine value of 1 to 30 mgKOH/g,
an average particle diameter of the light-transmitting resin particle is from 6 to 20 μm,
the copolymerization product is a modified acrylic block copolymerization product,
an acid value of the copolymerization product is 20 mgKOH/g or less,
the copolymerization product is contained in a range of 0.01 to 5.0 mass % based on the light-transmitting resin,
a content ratio of the light-transmitting resin particle in the antiglare layer is from 3 to 30 mass %, and
a film thickness of the antiglare layer is from 10 to 25 μm.

2. The antiglare film according to claim 1,
wherein a mass average molecular weight of the copolymerization product is from 1,000 to 100,000.

3. The antiglare film according to claim 1,
wherein the antiglare layer is a layer containing a structural unit formed from a polymer or copolymer including at least one member of following (A1) and (A2) or from a mixture of the polymer and copolymer:
(A1) an alkyl acrylate containing an alkyl group having a group selected from the group consisting of a hydroxyl group and an acryloyl group; and
(A2) an alkyl methacrylate containing an alkyl group having a group selected from the group consisting of a hydroxyl group and an acryloyl group.

4. An antireflection film, comprising:
the antiglare film according to claim 1; and
a low refractive index layer having a refractive index which is lower than a refractive index of the antiglare layer.

5. The antireflection film according to claim 4,
wherein the low refractive index layer contains a hollow silica particle.

6. A polarizing plate, comprising:
two protective films; and
a polarizing film provided between the protective films,
wherein at least one of the protective films is the antiglare film according to claim 1.

7. An image display device, comprising:
a display; and
the antiglare film according to claim 1 disposed at a surface of the image display.

8. The antiglare film according to claim 1,
wherein the light-transmitting resin particle is selected from the group consisting of crosslinked polymethyl methacrylate, crosslinked methyl methacrylate-styrene copolymer, crosslinked methyl methacrylate-methyl acrylate copolymer, crosslinked acrylate-styrene copolymer particle, crosslinked polystyrene particle, crosslinked methyl methacrylate-crosslinked modified acrylate copolymer particle, melamine/formaldehyde resin particle, and benzoguanamine/formaldehyde resin particle.

9. The antiglare film according to claim 1,
wherein the light-transmitting resin particle is selected from the group consisting of crosslinked polymethyl methacrylate and crosslinked methyl methacrylate-styrene copolymer.

* * * * *